T. O'CONNOR.
Spike Machines.
No. 137,709.
Patented April 8, 1873.
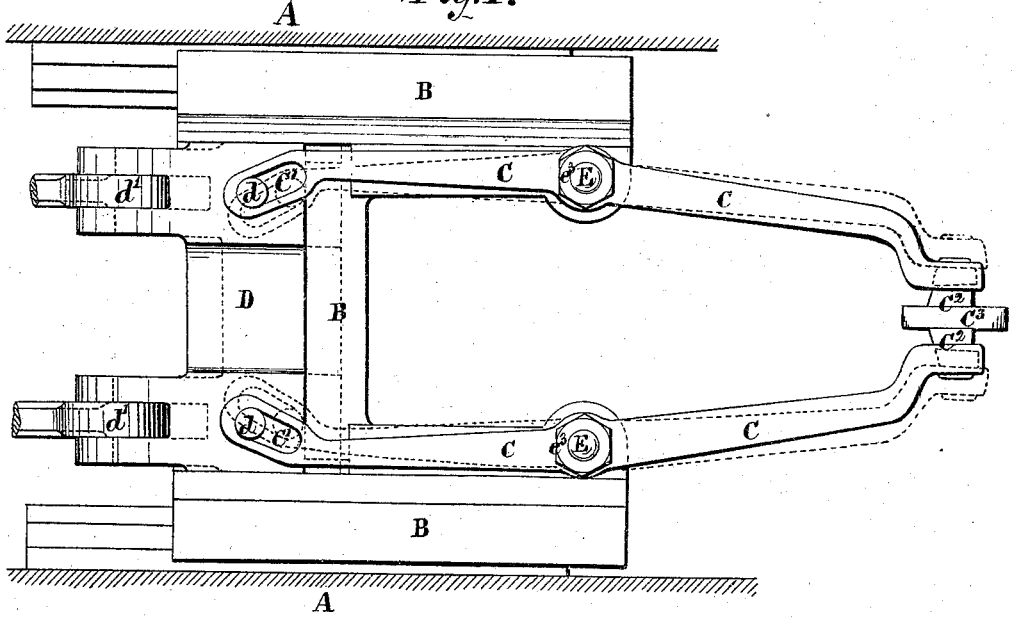
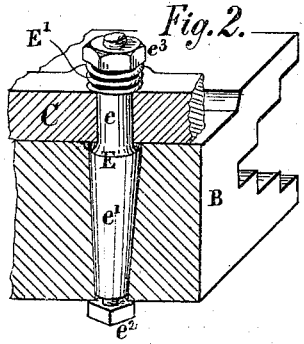
WITNESSES:
Walter Allen
W. H. Pearce
INVENTOR.
Thomas O'Connor
By Knight Bro.
Attys.

UNITED STATES PATENT OFFICE.

THOMAS O'CONNOR, OF ST. LOUIS, MISSOURI, ASSIGNOR TO ST. LOUIS RAIL-FASTENING COMPANY, OF SAME PLACE.

IMPROVEMENT IN SPIKE-MACHINES.

Specification forming part of Letters Patent No. 137,709, dated April 8, 1873; application filed December 11, 1872.

*To all whom it may concern:*

Be it known that I, THOMAS O'CONNOR, of the city and county of St. Louis and State of Missouri, have invented an Improved Method of Pivoting the Nipper-Arms of Spike-Machines, of which the following is a specification:

My invention consists in providing the pivot-pin of the nippers with a tapering shank, fitting in a similar hole in the nipper-arm slide or carriage, and held in place by a nut screwed on the lower end of the pin. The pin has a cylindrical upper portion, which forms the pivot of the nipper-arm. Said nippers are for the purpose of grasping and carrying the blank spike from the cutter-head to the griping-jaws, by which the blank is held until the reciprocating "header" upsets a head on it. My invention also consists in placing over the nipper-arms a spring which surrounds the pivot and is held by a nut screwed on the pin. The purpose of said spring is to hold the nipper-arm in position, and at the same time to allow it to rise up should it become bent, or caught in the slide or carriage.

Figure 1 is a top view of the carriage and nipper-arms. Fig. 2 is a sectional perspective view of my improved pivot-pin attached to the carriage and carrying the nipper-arm.

A is the frame of the machine, in which is arranged to slide a carriage or slide, B, to which are pivoted the nipper-arms C by pins E. D is a slide or carriage arranged to slide in the carriage or slide B. The slide D has a reciprocating movement communicated to it by an eccentric on the driving-shaft of the machine through a rock-shaft and connecting-rods $d^1$. The carriage D is provided with pins $d$, which move in the inclined slots $C^1$ of the nipper-arms C. $C^2$ are removable jaws by which the spike-blank $C^3$ is held. E is the pivot or fulcrum pin of the nipper-arms, having a tapering or frusto-conical shank, $e^1$, passing through a similarly-formed hole in the carriage B, and held in place by a nut, $e^2$, screwed on its lower end beneath the carriage. The pins heretofore used in this position have had a cylindrical shank, and have been found in practice, owing to the great jar and pressure to which they are subjected, to become loose; and consequent to the resulting "lost motion" the nippers would fail to operate properly on the spike-blank, and the blank would be spoiled. To overcome this difficulty I make the shank $e^1$ of a tapering form, so that it not only admits of being fitted quite tightly in its socket when first made, but if it becomes loose, owing to the pressure and jarring, it may be tightened by driving it down and screwing up the nut $e^2$. $e$ is the cylindrical upper part of the pin E, said part forming the pivot of the nipper-arm. E' is a spiral spring between the nipper-arm and the retaining-nut $e^3$. This spring holds the nipper-arm down in its place with sufficient force, but allows it to rise without breakage of the arm or pin E in case it becomes jammed or bent.

The operation of the parts is as follows: The carriage B remains stationary while the carriage D is closing the jaws $C^2$ of the nipper-arms C on the spike-blank $C^3$, by means of the pins $d$ moving in the inclined slots $C^1$; then the carriage B is drawn along by the nipper-arms with the carriage D, so as to carry the blank spike back from the cutter head, that cuts and forms the point of same, to the griping and heading attachments, all of which movements are described in the patents of David Eynon, No. 100,755, dated January 3, 1872, and James H. Sweet, No. 10,645, dated March 4, 1854, to which reference is made for the description of the action of the machine.

I claim as my invention—

1. The pin E, having cylindrical body $e$, tapering shank $e^1$, nuts $e^2$ $e^3$, in combination with the carriages B D and nipper-arms C, as and for the purpose set forth.

2. The pin E, nut $e^3$, and spring E', in combination with the nipper-arm C, as and for the purpose set forth.

THOMAS O'CONNOR.

Witnesses:
 SAML. KNIGHT,
 C. MINNIGERODE, Jr.